Aug. 5, 1969

G. E. V. MONGODIN ET AL  3,459,228
SEQUENTIALLY CLOSING AND OPENING ALTERNATELY
SEATING FLOW CONTROLLERS

Filed July 26, 1967

Inventors:
Guy Emile Victor Mongodin
and
Jean Joseph Moncozet
BY Baldwin Wight Diller & Brown
Attorneys

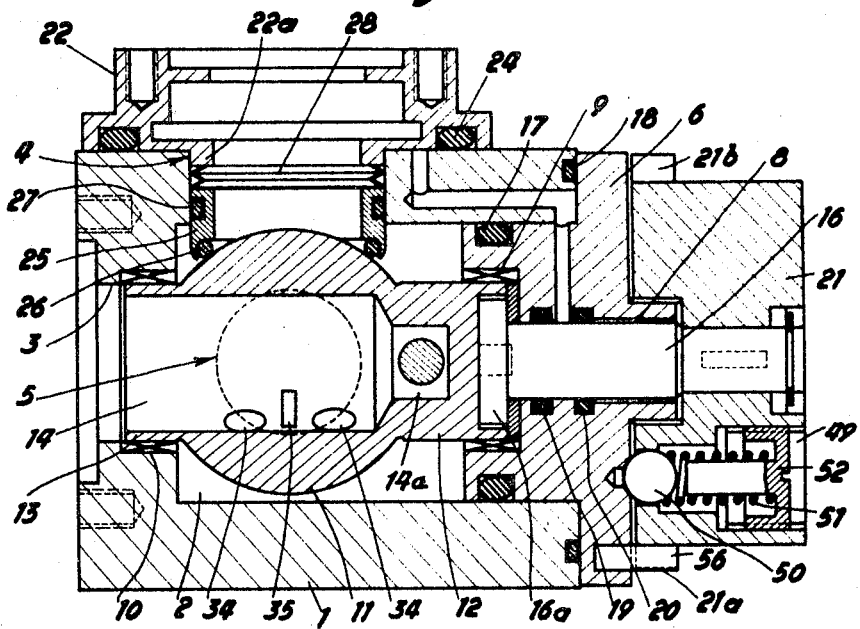
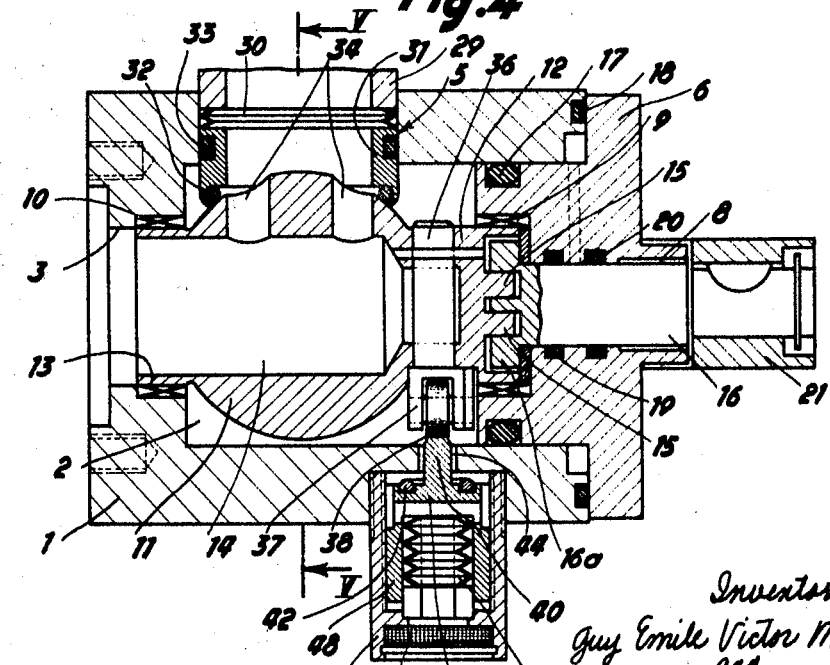

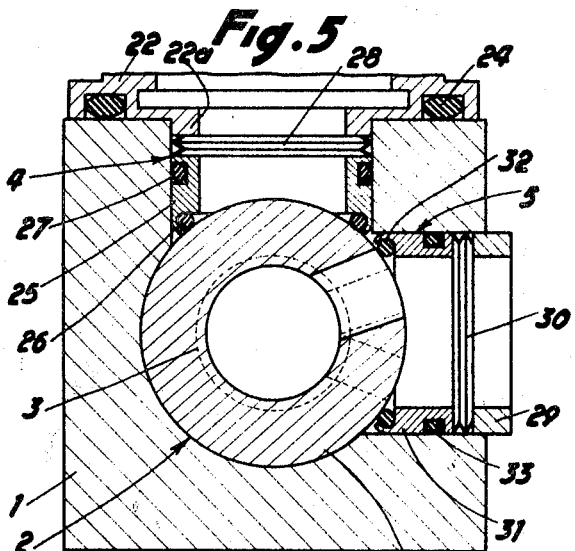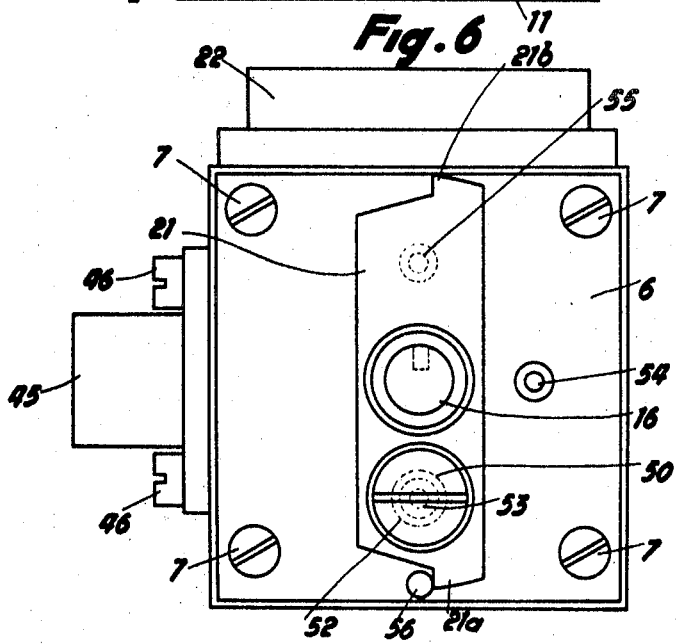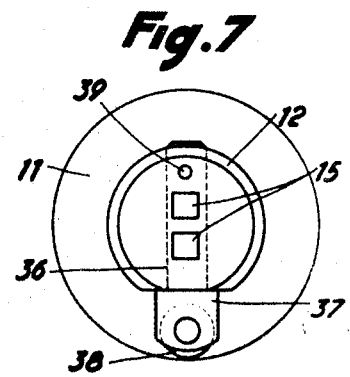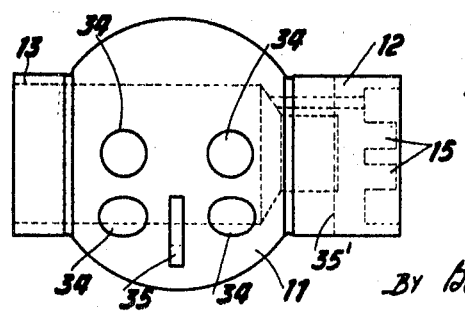

United States Patent Office 3,459,228
Patented Aug. 5, 1969

3,459,228
SEQUENTIALLY CLOSING AND OPENING ALTERNATELY SEATING FLOW CONTROLLERS
Guy Emile Victor Mongodin, Fresnes, and Jean Joseph Moncozet, Annecy, France, assignors to Societe Anonyme, Societe Alsacienne de Constructions Atomiques de Telecommunications et d'Electronique Alcatel, Paris, France, a corporation of France
Filed July 26, 1967, Ser. No. 656,262
Claims priority, application France, Aug. 1, 1966, 71,696
Int. Cl. F16k 11/07, 31/04
U.S. Cl. 137—627.5   6 Claims

ABSTRACT OF THE DISCLOSURE

A body type cock is described, comprising on the one hand a first aperture to which the parts to be tested for leakage can be connected, an aperture connected to a pre-exhausting pump, an aperture connected to a mass spectrometer leak detection unit, and an aperture for re-admitting air into the interior of the body, and on the other hand a spherical plug rotatable about one diametrical axis provided with an axial bore in alignment with the said first aperture and having a plurality of cylindrical ports and also having a port of rectangular section formed on the great circle situated in the median plane perpendicular to the axis of rotation of the plug, all the ports being substantially radial and leading into the aforesaid bore; the rectangular port partially preceding the first cylindrical ports in the direction of the opening of the cock.

---

This invention relates to a programmed cock for leak detector mass spectrometers having a built-in pre-exhausting auxiliary unit.

It is known that for the purpose of detecting leaks by means of a mass spectrometer leak detection installation it is necessary to make successive connections between the apparatus to be examined and the various pipes of the installation. These connections necessitate the successive opening and closing in a clearly determined order of three valves, which are:

A pre-exhausting valve bringing the part to be examined into communication with the pipe of a "pre-exhausting" pump;

A valve making the connection to the detector apparatus;

An air admission valve restoring ambient pressure in the part to be examined.

In general, the inspection operations take place in the following manner:

The part whose sealing is to be verified is connected to a pipe which is in communication with the appertaining orifices of the three valves referred to above.

The first operation is to connect the part to be examined to a pre-exhausting pump by opening the first valve.

When the vacuum reaches for example $10^{-2}$ torr, the second valve is opened to bring the part into communication with the mass spectrometer detection unit. This operation may be performed more or less gradually, or abruptly, according to the nature of the testing installation.

When the valve making the connection to the detection unit is open, the pre-exhausting valve is closed. In certain known apparatuses this operation is effected simultaneously with the opening of the valve making the connection to the detection unit.

When the measurement is completed, this valve making the connection to the detector is closed and the air admission valve is opened, thereby returning the part under examination to ambient pressure.

As these various operations take place in a clearly determined sequential order, it is possible to achieve programmed control of the operation of the leak detection installation. This programming may be by mechanical means, leading to a very robust and very reliable unit. In certain cases however, electric means are used, including electromagnetic valves having a plunger-type actuating member; such valves may be abrupt and imperfect in operation.

It must be noted, however, that in the process explained above operations can take place only provided the pre-exhausting pump can draw a vacuum of the order of $10^{-2}$ torr rapidly; that is to say the leak detector can be used only on apparatus having little or no leakage.

If, the leakage is high, it will be observed that the pre-exhaust vacuum is drawn slowly or does not reach the required low value, for example it does not fall below 1 torr, or that after the detector has been connected the gauge of the detector becomes saturated. In such a case a whole series of manual operations must be carried out, which, operations are the more complicated the more elaborate the electrical program controlling the installation.

In the simplest case, after the automatic control circuits have been put out of action, it is necessary to return to the pre-exhausting operation and, keeping the pre-exhausting pump operating, to open the valve connecting the detector extremely slowly, by finely controlling the flow of air in circulation to distribute it between the pre-exhausting pump and the detector. It is thus possible to maintain a pressure below $10^{-4}$ torr in the analysis cell and to effect detection.

In conclusion, in the present state of the art, although it is possible to control the sequence of the leak detection operations, by program control means, when the leakage is small, if the leakage is high complicated manual operation, calling for initiative and skill on the part of an operator is necessary, since optimum conditions of distribution of the flow of gas between the pre-exhausting unit and the detector must then be sought.

The invention has the aim of simplifying the various testing operations, whether the leakage rate is high or not.

Another object of the invention is to reduce the number of pipes and valves in the detection installation, to make the latter lighter and easier to handle, while making it possible to program control the test operations so as to avoid errors or incorrect operation which might falsify the observations, or possibly cause damage to the part or to the detector installation.

The present invention therefore provides a programmed cock for a leak detector mass spectrometer for use with an auxiliary pre-exhaust pump, the cock comprising a rotatable plug having an inner cavity and housed within a stationary cock body having first, second and third channels for respective connection to the part to be tested for leakage, to the pre-exhaust pump, and to the mass spectrometer unit; the plug cavity being, in use, continuously connected with the first channel, the second and third channels being disposed around the rotational path of the plug surface; the plug having a port or ports opening at its surface and communicating with the plug cavity, the port opening or openings being so shaped and so disposed that, as the plug is rotated from a closed stop-position, communication between the plug cavity and the second channel increases progressively at first, the cavity communicating with the third channel before ceasing to communicate with the second channel, communication with the third channel also increasing at first, communication between the plug cavity and the second channel ceasing before the plug reaches an open stop-position; a valve being provided to admit air to the plug cavity only when the cock is in the closed position.

In a preferred arrangement, the cock plug is spherical, bearing means being provided receiving the plug for rotation within an inner chamber of the body and about a diametrical axis coinciding with the axis of the first channel; a knob being disposed on the outside of the body and coupling means being provided, coupling the knob to the spherical plug, the knob and the coupling means co-operating in rotating the plug about the said axis, the plug cavity being in the form of an axial bore on the said axis and communicating with the first channel; there being provided in the plug a plurality of cylindrical ports disposed in leading and trailing groups in the direction of opening of the cock, and a rectangular port lying on the great circle in the median plane perpendicular to the axis of rotation of the plug, all of the ports being substantially radial and leading into the axial bore, the rectangular port partially preceding the leading group of cylindrical ports, the second and third channels being sealingly connected with a median portion of the outer surface of the plug embracing the openings of the ports.

The spherical plug may be provided with two journals diametrically opposed and centered about the aforesaid axis, the bearing means comprising needle of self-lubricating bearings housed in circular recesses formed in the body of the cock and respectively receiving the journals.

The aforesaid closed and open stop-positions may be provided by a fixed stop on the outside of the cock body co-operating with two diametrically opposed stop portions associated with the knob. The inner chamber of the body may have an opening on the side opposite the first journal there being provided a closure member for closing the said opening to the inner chamber, the closure member having a bore co-axial with the axis of rotation of the plug; the said coupling means then includes a shaft sealingly mounted for rotation in the bore of the closure member.

Each of the aforesaid second and third channels may be provided with an annular sleeve slidably and sealingly engaging the channel and carrying a ring seal for engaging the surface of the spherical plug, there being provided connectors for respectively connecting the pre-exhausting pump and the mass spectrometer unit to the channels and elastic washers mounted between the connectors and the annular sleeves and arranged to press the ring seals of the sleeves into sealing engagement with the surface of the spherical plug. The aforesaid valve for admitting air may be provided with a filter.

One form of construction of a cock according to the invention is described hereinbelow, simply by way of example without limitation, with reference to the accompanying drawings, in which:

FIGURE 3 is a section along the line III—III in FIGURE 2;

FIGURE 4 is a section along the line IV—IV in FIGURE 1;

FIGURE 5 is a section along the line V—V in FIGURE 4;

FIGURE 6 shows the cock in front view;

FIGURE 7 shows the cock plug in end view;

FIGURE 8 shows the plug viewed in profile from the side on which the radial ports are provided.

Figure 1:
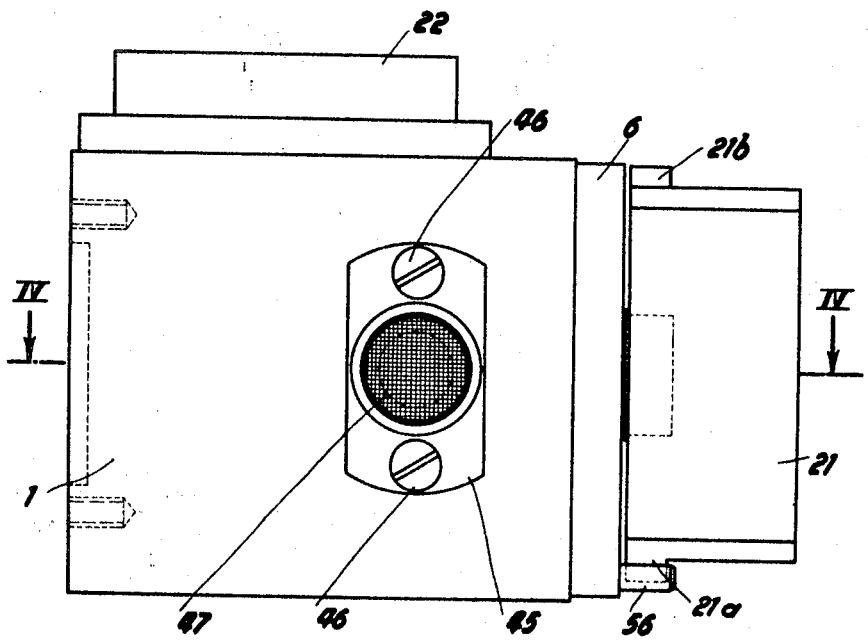
FIGURE 1 shows the cock in profile elevation.
Figure 2:
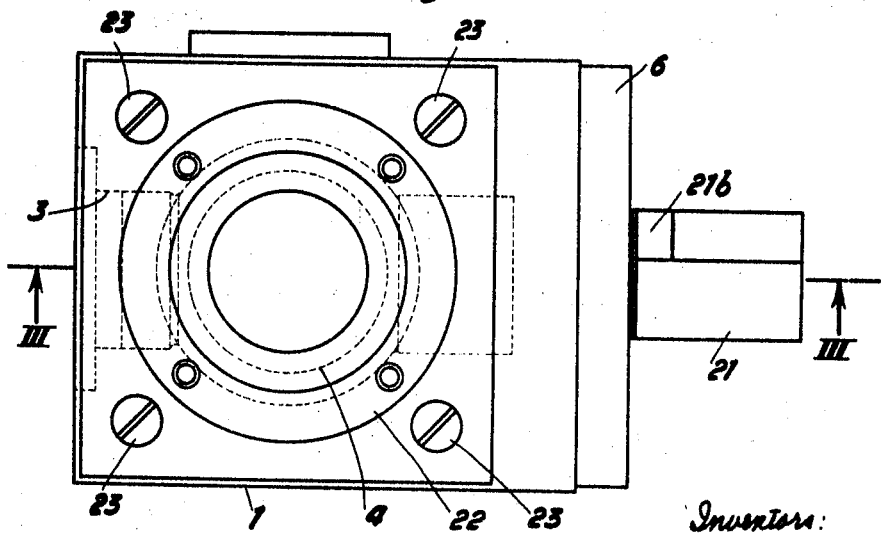
FIGURE 2 shows the cock viewed from above.

The cock comprises a body 1 (FIGURES 1 to 5) in the form of a rectangular parallelepiped, in which there is formed a cylindrical bore 2 ending in a bore 3 of smaller diameter constituting an axial orifice.

On its top face the body is provided with an aperture 4 leading into the bore 2 and, on one of its side faces, with an aperture 5 likewise leading into said bore.

The bore 2 is closed by a closure member 6 fixed on the body by means of screws 7 (FIGURE 6) and pierced by an axial bore 8.

In the closure member 6 and in the bore 3, adjacent the bore 2, there are formed bearing surfaces receiving needle bearings 9 and 10 respectively. Suitable bearing means other than needle bearings may, of course, be used.

In these bearings a spherical plug 11, provided with journals 12 and 13 engaging the bearings, is mounted to rotate. The plug 11 has an axial bore 14 passing through the journal 13, and the centre of the plug and terminating in the journal 12 in a blind bore 14a of smaller diameter.

The end of the journal 12 is provided with fingers 15 engaging, as illustrated in FIGURE 4, in grooves formed in a plate 16a terminating an operating key 16, enabling the plug 11 to be rotated about the axis of the bore 2.

Two sealing rings 17 and 18 seal the joint between the closure member 6 and the body 1, and two other sealing rings 19 and 20 similarly seal the key 16 in the bore 8. On the end of the key there is located, by means of a Woodruff key, a handle 21 provided with two diametrically opposite stops 21a and 21b for engaging a stop pin 56.

A collar 22a of a connection flange 22 fixed on the body by screws 23 (FIGURE 2) after the insertion of a ring seal 24, fits into the aperture 4 in the body.

Beneath the collar 22a of the flange 22 there is disposed a ring 25 sliding in the aperture 4 and carrying at its bottom a ring seal 26 capable of making sealing contact with the plug 11 when pressed thereon. This ring 25 carries a ring seal 27, sealing it to the bore 4 and is pressed on the plug 11 by a plurality of elastic washers 28 bearing against the collar 22a of the flange 22.

In the aperture 5 (FIGURES 4 and 5) of the body 1 there is fixed another flange 29, or equivalent connection means, against which a plurality of elastic washers 30 bear, to apply thrust to a ring 31 sliding in said aperture 5. This ring 31 is provided with a ring seal 32 for sealing against the plug 11 in a manner similar to the ring seal 26. A ring seal 33 seals the ring 31 in the aperture 5.

As illustrated in FIGURE 8, there are provided in the spherical plug 11 a plurality of ports 34 of cylindrical section and substantially radial, and also a port 35 of rectangular section whose outer opening reaches beyond the two ports 34 with which it is associated. All these ports lead into the axial bore 14 in the plug 11.

In the journal 12 (FIGURES 7 and 8) there is formed a hole 35' to receive the tail 36 of a fork 37 carrying a roller 38. The tail 36 is fixed in the hole 35' by a pin 39 inserted in the journal 12. In the course of the rotation of the plug the roller 38 can come into contact with an actuating pin 40 (FIGURE 4) of a valve 41 provided with a seal 42. This valve is normally pressed by the thrust of elastic washers 43 against the wall of a recess in the body 1, there being a hole 44 in the body through which the pin 40 passes.

This assembly of the valve 41 is contained in a housing 45 fixed on the body 1 by screws 46 (FIGURE 6). This housing also carries a filter 47 (FIGURE 4) and a sleeve 48 supporting the elastic washers 43. This arrangement ensures that air will re-enter the bore 14 in the body 1 when the roller 38 pushes back the valve 41 normally closing the hole 44.

In the handle 21 there is provided a recess 49 receiving a ball 50 acted on by the thrust of a spring 51 bearing against a screw 52, which enables the tension of said spring to be adjusted. In the course of the rotation of the handle 21, the ball 50 can engage in depressions 53, 54, 55 formed in the closure member 6 and corresponding to three mutually orthogonal positions of the handle, which is thus locked in these positions when the ball 50 engages therein.

It will be seen that this cock can take the place of the three valves and the corresponding pipes ordinarily used to serve the same purpose and that it enables all the required operations to be grouped in a predetermined programmed order. Furthermore, the cock is operated by a single handle 21, or equivalent means, whose rotation is limited to a single revolution by the stops 21a and 21b, which engage the pin 56 fixed to the closure member 6.

The operation of the cock is as follows: the aperture 4 in the body 1 being normally connected to the mass spectrometery detection unit and the aperture 5 to the pre-exhausting pump, the part to be tested for leakage is connected to the aperture 3. The following is the sequence of operation:

(1) From the closed position in which the stop 21a is in contact with the stop pin 56 and the ball 50 is engaged in the depression 53, the handle 21 is brought into the orthogonal position which brings the part to be tested into communication with the pre-exhausting pump. The ball 50 is then engaged in the depression 54;

(2) The operator reads the pre-exhausting gauge and, depending on the reading, proceeds in the following manner:

(a) If the gauge indicates that the primary vacuum is satisfactory (for example $10^{-2}$ torr), he rapidly turns the handle 21 until the stop 21b encounters the stop pin 56; the ball 50 engages in the depression 55. In the course of this operation the part to be tested is progressively brought into communication with the detection unit. The operations of detection of small leaks or of the absence of leaks take place normally;

(b) If the primary gauge indicates a considerable leak, the operator slowly turns the handle 21 to the detection position, so that the part to be tested remains under the action of the pre-exhausting pump and is also brought partially into communication with the detector spectrometer, through the medium of all or part of the slot 35, which acts as a throttling slot, avoiding raising the vacuum of the detector above a fairly low value (for example $10^{-4}$ torr). The operator then stops turning the cock and carries out the detection operations. If these operations are completed by the plugging of the leaks, the operator can then push the handles 21 until the stop 21b encounters the stop finger 56, and thereafter complete the detection operations. If, on the other hand, the plugging has not been completed, once the leaks have been detected it will be possible to effect their subsequent elimination.

On completion of the leak detection or vacuum verification operations, in both cases (a) and (b) the operator returns the handle 21 to its starting position, against the pin 56. In this position the roller 38 pushes back the pin 40 of the valve 42 and the latter opens the aperture 41, re-admitting air into the bore 2 and into the part under examination, which can then be separated from the pipe cone connecting it to the cock.

Another part can then be placed in position for similar examination.

What is claimed is:

1. A programmed cock for leak detector mass spectrometers for use with an auxiliary pre-exhaust pump, the cock comprising: a body having an inner chamber and four apertures, first, second and third of said apertures being respectively arranged for connection to parts to be tested for leakage, to the pre-exhaust pump, and to the mass spectrometer unit, the fourth of said apertures being arranged for admitting air into the inner chamber; a spherical cock plug; bearing means receiving the plug for rotation within the inner chamber about a diametrical axis coinciding with the axis of the said first aperture; a knob disposed on the outside of the body and coupling means coupling the knob to the spherical plug, the knob and the coupling means co-operating for rotating the plug about said axis, the plug having an axial bore on the said axis and communicating with the first aperture; the plug having a plurality of cylindrical ports, disposed in leading and trailing groups in the direction of opening of the cock, and a port of rectangular section formed on the great circle situated in the median plane perpendicular to the axis of rotation of the plug, all of the ports being substantially radial and leading into the axial bore, the rectangular port partially preceding the leading group of cylindrical ports; connection means sealingly connecting the said second and third apertures with a median portion of the outer surface of the plug, said surface embracing the openings of the ports, said second and third apertures and said outer port openings being so co-operatively disposed, that, as the cock plug is rotated in the opening direction, communication between the axial bore and the second aperture increases progressively at first, the axial bore communicating with the third aperture via the rectangular port before ceasing to communicate with the second aperture via the cylindrical ports, said communication with the third aperture also increasing at first; a valve associated with the fourth aperture and biased to close the aperture against the admission of air to the said inner chamber; and valve operating means connecting the plug with the said valve to hold the valve open only when the cock is in the closed position.

2. A cock as claimed in claim 1, wherein the spherical plug is provided with two journals diametrically opposed and centered about said axis and wherein the said bearing means comprises needle bearings housed in circular recesses formed in the body of the cock and respectively receiving the journals.

3. A cock as claimed in claim 1, wherein the body is provided on the outside with a fixed stop and the knob is provided with two diametrically opposed stop portions, the fixed stop and the stop portions being arranged to co-operate in limiting the rotation of the knob and the plug to a single revolution.

4. A cock as claimed in claim 1, wherein the inner chamber of the cock body is open on the side opposite the said first aperture; wherein there are provided a closure member closing the said opening to the inner chamber, the closure member having a bore coaxial with the axis of rotation of the plug and having annular grooves and seals housed in the annular grooves; and wherein the said coupling means includes a shaft mounted for rotation in the bore of the closure member and sealed by the just-mentioned seals.

5. A cock as claimed in claim 1, wherein the said second and third apertures are each provided with an annular sleeve slidably and sealingly engaging the aperture and carrying a ring seal for engaging the surface of the cylindrical plug, there being provided connectors for respectively connecting the pre-exhausting pump and the mass spectrometer detection unit to the said apertures, and elastic washers mounted between the connectors and the annular sleeves and arranged to press the ring seals of the sleeves into sealing engagement with the surface of the cylindrical plug.

6. A cock as claimed in claim 1, wherein the said fourth aperture is provided with a filter.

References Cited

UNITED STATES PATENTS

| 2,856,150 | 10/1958 | McDonald | 251—182 X |
| 3,308,850 | 3/1967 | Gill | 251—183 X |
| 3,380,479 | 4/1968 | Bassan | 137—627.5 |

CLARENCE R. GORDON, Primary Examiner

U.S. Cl. X.R.

137—609, 612, 625, 628, 629